“2,848,497
Patented Aug. 19, 1958”

2,848,497

PROCESS FOR ISOMERIZING 8α-METHYL-1,2,3,4,6,7,8,8α-OCTAHYDRO-1-ETHYNYL-1β-HYDROXY-6-OXONAPHTHALENE AND ISOMER OBTAINED THEREBY

Melvin S. Newman, Columbus, Ohio, and Sambasiva Swaminathan, Mylapore, India, assignors to The Ohio State University Research Foundation, Columbus, Ohio, a corporation of Ohio No Drawing. Application March 8, 1954
Serial No. 414,885

3 Claims. (Cl. 260—586)

This application is a continuation-in-part of our application Serial No. 267,097, filed January 18, 1952, now abandoned, which is a continuation-in-part of our application Serial No. 242,982, filed August 21, 1951, and now Patent No. 2,614,123. The inventions disclosed in this application relate to new compositions of matter and to methods for their preparation.

One object of this invention is to produce a new composition of matter consisting of 1-acetyl-6-oxo-8α-methyl-3,4,6,7,8,8α-hexahydronaphthalene, and 8α-methyl-1,2,3,-4,6,7,8,8α-octahydro-1-ethynyl-1α-hydroxy-6-oxonaphthalene. The 1-acetyl-6-oxo-8α-methyl-3,4,6,7,8,8α-hexahydronaphthalene can be converted to cortisone according to the procedure disclosed in U. S. Patent 2,673,872, or according to the procedure disclosed by Friedmann et al. [Chemistry and Industry, September 15, 1951, pp. 777–778]. The 8α-methyl-1,2,3,4,6,7,8,8α-octahydro-1-ethynyl-1α-hydroxy-6-oxonaphthalene produced by the process of the present invention can be converted to the 1-acetyl-6-oxo-8α-methyl-3,4,6,7,8,8α - hexahydronaphthalene by refluxing in formic acid. The 8α-methyl-1,2,3,-4,6,7,8,8α-octahydro - 1 - ethynyl-1α-hydroxy-6-oxonaphthalene can also be converted to an active insecticide by reacting with a halogenated organic acid, e. g., monochloroacetic acid, and reacting the product produced thereby with a metal thiocyanate, e. g., potassium thiocyanate. The compounds produced by the present invention are also useful as plant growth regulators.

The starting compound for the process of the present invention is 8α-methyl-1,2,3,4,6,7,8,8α-octahydro-1-ethynyl-1β-hydroxy-6-oxonaphthalene and the process of making it is disclosed in application for United States Patent Serial No. 414,886, filed March 8, 1954, now Patent No. 2,714,615. In order to produce the new compositions of matter of the present invention, we react the above described starting material with formic acid by dissolving it in formic acid and refluxing. The starting compound as stated in said copending application has a formula as follows:

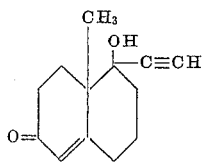

Also as stated in said copending application Serial No. 414,886, the compound has a melting point at 171.5–172.5 and was analyzed to have C, 76.3–76.4 and H, 7.8. The above starting compound is considered as the β-epimer and based on the analogy to configurations that have been ascribed to ethynyl alcohols prepared from 17-keto steroids, is considered to have the valence bond of the hydroxyl group above the plane of the paper.

The acetyl compound has a formula as follows:

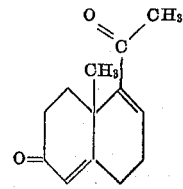

It will be noted that not only are the ethynyl and hydroxyl radicals (i. e. 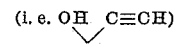)

converted into the acetyl radical (i. e. 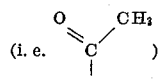)

but also the 1 and 2 carbons become unsaturated through the introduction of a double bond between them.

We have found that by the use of our process not only do we produce the 1-acetyl compound which is the main object of our process, but we also produce an isomer thereof which is also an epimer of the starting compound having a melting point at 145–146 degrees centigrade. In line with our assumptions above in regard to the β starting compound, we designate the new epimer as an α compound and ascribe a configuration in which the hydroxyl group is below the plane of the paper.

Following are examples of the process we have used to produce our novel compositions of matter:

*Example 1.—1-acetyl-6-oxo-8α-methyl-3,4,6,7,8,8α-hexahydronaphthalene*

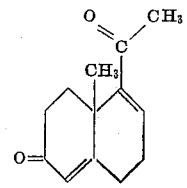

A solution of 8α-methyl-1,2,3,4,6,7,8,8α-octahydro-1-ethynyl-1-β-hydroxy - 6 - oxonaphthalene (melting point 171–172 degrees, 2.8 grams) in formic acid (92 percent; 16 milliliters) was refluxed for two hours. The reaction mixture was then poured into water and the aqueous suspension extracted with ether twice. The ether extract after successive washings with dilute sodium hydroxide solution, water and saturated sodium chloride solution was dried over anhydrous sodium sulfate and later concentrated. A brown viscous residue remained and was chromatographed on a column of deactivated alumina (Fisher) prepared by treatment with methanol and subsequent drying for 6 hours at 130 degrees.

The reaction product was dissolved in dry benzene (100 milliliters) and passed through the column. After most of the benzene had passed through, the column was eluted with ether (200 milliliters) and the ether solution concentrated. A viscous liquid remained and solidified on cooling. The solid was crystallized from ether; melting point 90–93 degrees. A recrystallization from ether yielded the desired acetyl compound having the formula shown above, melting at 92–93 degrees centigrade and exhibiting the following characteristics.

Ultra-violet spectrum:

$$\lambda_{Max}^{EtOH}\ 234\ m\mu;\ \log_{10} E\ 4.29$$

*Analysis.*—Calculated for $C_{13}H_{16}O_2$: C, 76.4; H, 7.9. Found: C, 76.7; H, 8.0.

*Example 2.—8α-methyl-1,2,3,4,6,7,8,8α-octahydro-1-ethynyl-1-α-hydroxy-6-oxonaphthalene*

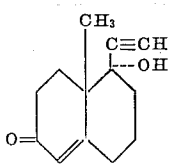

A solution of 4.5 grams of 8α-methyl-1,2,3,4,6,7,8,8α-octahydro-1-ethynyl-1-β-hydroxy-6-oxonaphthalene (melting point 171–172 degrees centigrade) in 92 percent formic acid (20 milliliters) was fluxed gently for one hour. At the end of this period, the excess formic acid was removed by distillation under reduced pressure. The dark brown residue was taken up in ether (150 milliliters) and the ether solution washed with two percent potassium carbonate solution (100 milliliters) and saturated sodium chloride solution. After drying over anhydrous sodium sulfate, the ether solution was treated with animal charcoal and filtered. The filtrate was concentrated to a small volume and cooled in ice deposited crystals. These were collected and recrystallized from ether containing a small amount of ethanol to yield the α epimer of the starting material having melting point 145–146 degrees centigrade and exhibiting the following characteristics.

Ultra-violet spectrum:

$$\lambda_{Max}^{EtOH}\ 240\ m\mu;\ \log_{10} E\ 4.16$$

*Analysis.*—Calculated for $C_{13}H_{16}O_2$: C, 76.4; H, 7.9. Found: C, 76.1, 76.3; H, 7.6, 7.7.

The ethynyl alcohol, described above, furnished a red 2,4-dinitrophenylhydrazone which after a crystallization from ethanol melted at 195–198 degrees.

*Analysis.*—Calc. for $C_{19}H_{20}N_4O_5$: C, 59.4; H, 5.3; N, 14.6. Found: C, 59.3; H, 5.4; N, 14.6.

It is to be understood that modifications of this compound coming within the scope of the invention are intended to be covered by the claims hereof.

We claim:

1. A composition of matter consisting of 8α-methyl-1,2,3,4,6,7,8,8α-octahydro-1-ethynyl-1α-hydroxy-6-oxonaphthalene having a melting point of 145–146 degrees centigrade.

2. A process of producing an 8α-methyl-1,2,3,4,6,7,8,8α-octahydro-1-ethynyl-1α-hydroxy-6-oxonaphthalene which comprises refluxing a solution of 8α-methyl-1,2,3,4,6,7,8,8α-octahydro-1-ethynyl-1β-hydroxy-6-oxonaphthalene in formic acid and separating 8α-methyl-1,2,3,4,6,7,8,8α-octahydro-1-ethynyl-1α-hydroxy-6-oxonaphthalene from the reflux mixture.

3. A process for isomerizing 8α-methyl-1,2,3,4,6,7,8,8α-octahydro-1-ethynyl-1β-hydroxy-6-oxonaphthalene which comprises refluxing a solution of said compound in formic acid and separating 8α-methyl-1,2,3,4,6,7,8,8α-octahydro-1-ethynyl-1α-hydroxy-6-oxonaphthalene having a melting point of about 145–146 degrees centigrade.

References Cited in the file of this patent

UNITED STATES PATENTS

| | | |
|---|---|---|
| 2,614,123 | Newman et al. | Oct. 14, 1952 |
| 2,673,872 | Newman et al. | Mar. 30, 1954 |

OTHER REFERENCES

Chanley, Jr.: J. A. C. S., 1948, vol. 70, page 244.
Friedmann et al.: Chem. and Ind., September 15, 1951, pages 777–8.